(12) United States Patent
Kumar et al.

(10) Patent No.: US 10,323,314 B2
(45) Date of Patent: Jun. 18, 2019

(54) SINGLE BATH AUTODEPOSITION COATING FOR COMBINATION METAL SUBSTRATES AND METHODS THEREFOR

(75) Inventors: Girdhari Kumar, Pune (IN); Manesh Nadupparambil Sekharan, Midland, MI (US); Bashir M. Ahmed, Rochester, MI (US); Xueting Qiu, Pudong Shanghai (CN); Omar L. Abu-Shanab, Rochester Hills, MI (US); Brian J. Marvin, Warren, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 506 days.

(21) Appl. No.: 14/125,498

(22) PCT Filed: Jun. 15, 2012

(86) PCT No.: PCT/US2012/042739
§ 371 (c)(1),
(2), (4) Date: Mar. 31, 2014

(87) PCT Pub. No.: WO2012/174424
PCT Pub. Date: Dec. 20, 2012

(65) Prior Publication Data
US 2014/0234641 A1 Aug. 21, 2014

Related U.S. Application Data

(60) Provisional application No. 61/498,285, filed on Jun. 17, 2011.

(51) Int. Cl.

| | |
|---|---|
| C23C 2/04 | (2006.01) |
| C09D 133/08 | (2006.01) |
| C09D 135/06 | (2006.01) |
| C08G 18/58 | (2006.01) |
| C08G 18/80 | (2006.01) |
| C09D 175/04 | (2006.01) |
| C23C 2/02 | (2006.01) |
| C23C 2/26 | (2006.01) |
| C23C 2/28 | (2006.01) |

(52) U.S. Cl.
CPC ............... *C23C 2/04* (2013.01); *C08G 18/58* (2013.01); *C08G 18/8061* (2013.01); *C09D 133/08* (2013.01); *C09D 135/06* (2013.01); *C09D 175/04* (2013.01); *C23C 2/02* (2013.01); *C23C 2/26* (2013.01); *C23C 2/28* (2013.01); *Y10T 428/31678* (2015.04)

(58) Field of Classification Search
CPC ............ Y10T 428/31678; C08G 18/58; C08G 18/8061; C09D 175/04; C09D 133/08; C09D 135/06; C23C 2/04; C23C 2/02; C23C 2/26; C23C 2/28
USPC .................. 428/457; 427/202, 327
See application file for complete search history.

(56) References Cited

U.S. PATENT DOCUMENTS

| | | | |
|---|---|---|---|
| 3,063,877 A | 11/1962 | Schiffman et al. | |
| 3,253,039 A * | 5/1966 | Karpenko | ................ B01J 23/38 502/330 |
| 3,585,084 A | 6/1971 | Steinbrecher et al. | |
| 3,592,699 A | 7/1971 | Steinbrecher et al. | |
| 3,674,567 A | 7/1972 | Bradley et al. | |
| 3,709,743 A | 1/1973 | Dalton et al. | |
| 3,791,431 A | 2/1974 | Steinbrecher et al. | |
| 3,795,546 A | 3/1974 | Hall et al. | |
| 3,849,137 A | 11/1974 | Barzynski et al. | |
| 3,884,708 A * | 5/1975 | Burkert | ..................... B22C 7/02 106/270 |
| 4,030,945 A | 6/1977 | Hall et al. | |
| 4,103,049 A | 7/1978 | Nishida et al. | |
| 4,108,817 A | 8/1978 | Lochel | |
| 4,131,465 A | 12/1978 | Petropoulos | |
| 4,178,400 A | 12/1979 | Lochel | |
| 4,180,603 A | 12/1979 | Howell, Jr. | |
| 4,186,226 A | 1/1980 | Smith | |
| 4,189,611 A | 2/1980 | Sam | |
| 4,234,704 A | 11/1980 | Sakanaka et al. | |
| 4,242,379 A | 12/1980 | Hall et al. | |
| 4,289,826 A | 9/1981 | Howell, Jr. | |
| 4,306,010 A | 12/1981 | Uehara et al. | |
| 4,347,172 A | 8/1982 | Nishida et al. | |
| 4,373,050 A | 2/1983 | Steinbrecher et al. | |
| 4,632,900 A | 12/1986 | Demmer et al. | |
| 4,636,264 A | 1/1987 | Schellenberg et al. | |
| 4,636,265 A | 1/1987 | Fischer et al. | |
| 4,800,106 A | 1/1989 | Broadbent | |
| 5,066,374 A * | 11/1991 | Winkle | ................ C09D 5/4492 204/499 |
| 5,232,815 A | 8/1993 | Browne et al. | |
| 5,342,694 A | 8/1994 | Ahmed et al. | |
| 5,500,460 A | 3/1996 | Ahmed et al. | |

(Continued)

FOREIGN PATENT DOCUMENTS

| | | |
|---|---|---|
| CN | 1054836 A | 9/1991 |
| CN | 101563429 A | 10/2009 |

(Continued)

OTHER PUBLICATIONS

U.S. Appl. No. 09/578,935, filed May 25, 2000, Abandoned.
(Continued)

Primary Examiner — Frances Tischler
(74) Attorney, Agent, or Firm — Mary K. Cameron

(57) ABSTRACT

This invention relates to an autodeposition bath composition comprising a nitrogen containing compound, said bath being suitable for generating a uniform autodeposition coating on two or more of ferrous, aluminum, magnesium and zinciferous multi-metal substrate surfaces, treated either sequentially or simultaneously. The invention also provides autodeposition concentrate compositions for use in the bath, methods of making and using the concentrate and bath, as well as metal articles comprising an autodeposition coating according to the invention.

12 Claims, No Drawings

(56) References Cited

U.S. PATENT DOCUMENTS

| | | | |
|---|---|---|---|
| 6,096,806 A | 8/2000 | Mueller et al. | |
| 6,395,336 B1 | 5/2002 | Honda et al. | |
| 6,525,112 B1 | 2/2003 | Bammel | |
| 6,613,387 B2 | 9/2003 | Agarwal et al. | |
| 6,989,411 B2 | 1/2006 | Bammel et al. | |
| 7,138,444 B2 | 11/2006 | McGee et al. | |
| 7,388,044 B2 | 6/2008 | McGee et al. | |
| 8,313,570 B2 | 11/2012 | Abu-Shanab et al. | |
| 2004/0036056 A1* | 2/2004 | Shea | C08G 8/22 252/182.13 |
| 2006/0172076 A1* | 8/2006 | Rearick | B05D 7/142 427/430.1 |
| 2007/0243372 A1 | 10/2007 | Mowrey et al. | |
| 2008/0160199 A1 | 7/2008 | Sekharan et al. | |
| 2011/0003161 A1* | 1/2011 | Abu-Shanab | B05D 7/142 428/457 |

FOREIGN PATENT DOCUMENTS

| | | |
|---|---|---|
| EP | 0476821 A2 | 3/1992 |
| WO | 9108840 A1 | 6/1991 |
| WO | 199408729 | 4/1994 |
| WO | 2000071337 A1 | 11/2000 |
| WO | 0210479 A2 | 2/2002 |
| WO | 2002042008 A1 | 5/2002 |
| WO | 2009088993 A2 | 7/2009 |

OTHER PUBLICATIONS

International Search Report for PCT/US2012/042739, 4 pages.

"Epoxy Resins", Encyclopedia of Polymer Science and Engineering (Second Edition), vol. 6, pp. 322-382. Published by John Wiley & Sons, Copyright 1986.

Supplementary European Search Report for EP 12801103, dated Dec. 19, 2014, 2 pages.

\* cited by examiner

SINGLE BATH AUTODEPOSITION COATING FOR COMBINATION METAL SUBSTRATES AND METHODS THEREFOR

FIELD OF THE INVENTION

This invention relates to an autodeposition bath composition, and more particularly, this invention relates to an autodeposition bath composition suitable for generating a uniform autodeposition coating on two or more of ferrous, aluminum, magnesium and zinciferous multi-metal substrate surfaces. The invention also provides autodeposition concentrate compositions for use in the bath, methods of making and using the concentrate and bath, as well as metal articles comprising an autodeposition coating according to the invention.

BACKGROUND OF THE INVENTION

Autodeposition has been in commercial use on steel for about thirty years and is now well established for that use. For details, see for example, U.S. Pat. Nos. 3,063,877; 3,585,084; 3,592,699; 3,674,567; 3,791,431; 3,795,546; 4,030,945; 4,108,817; 4,178,400; 4,186,226; 4,242,379; 4,234,704; 4,636,264; 4,636,265; 4,800,106; and 5,342,694. The disclosures of all these patents are hereby incorporated by reference. Various resin systems have been used including vinyl, acrylic, epoxy and hybrid polymer systems. Epoxy resin and epoxy-acrylic autodeposition coating systems are described in U.S. Pat. Nos. 4,180,603; 4,289,826; 5,500,460; 6,096,806, 6,989,411, 7,138,444, and 7,388,044 and International Publication Number WO 00/71337, the teachings of each of which are incorporated by reference.

Autodeposition compositions are usually in the form of a liquid, usually aqueous solutions, emulsions or dispersions in which active metal surfaces of inserted articles are coated with an adherent resin or polymer film that increases in thickness the longer the metal remains in the bath, even though the liquid is stable for a long time against spontaneous precipitation or flocculation of any resin or polymer, in the absence of contact with the active metal. Those of skill in the art will understand resin as an organic polymer, most often synthetic, of at least about 5000 Daltons. When used in the autodeposition process, the autodeposition composition when cured forms a polymeric coating. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods or a like term. Autodeposition is often contrasted with electrodeposition. Although each can produce adherent films with similar performance characteristics, the dispersions from which they are produced and the mechanism by which they deposit are distinctly different. Electrodeposition requires that metal or other articles to be coated be connected to a source of direct current electricity for coating to occur. No such external electric current is used in autodeposition.

More recently attempts have been made to autodeposition coat non-ferrous metals such as zinc, aluminum magnesium and alloys thereof. Defect problems arose in seeking to use a single autodeposition coating bath to coat two or more different metal surfaces, such as ferrous, zinc, aluminum, magnesium and alloys thereof due to different activity levels of the metals, which required changes to bath chemistries even when coating different substrates at different times. It would thus be beneficial to produce an autodeposition coating composition and/or bath that can be used to coat two or more of these dissimilar metal surfaces, either simultaneously or sequentially, without significant changes in bath chemistry being required.

Another area where improvement to autodeposition coating compositions would be beneficial is in coating combination multi-metal substrates, which can be a metal substrate comprising a coating of a dissimilar metal, e.g. galvanized or galvannealed metal; assemblies of two or more dissimilar metal parts, such as a door of a passenger car; or a combination thereof. Conventional autodeposition coatings applied to a multi-metal workpiece had some shortcomings, resulting in pinholes and poor edge coating on metal workpieces comprising layers of dissimilar metals in the area of the exposed interface of two metals, for example at a cut edge of a metal panel coated with a dissimilar metal. Pinholes will be understood by those of skill in the coating arts to be small voids, about 0.1 to 1 mm in diameter, in the autodeposition coating where the coating's coverage is much thinner than the surrounding area. Some, but not all, pinholes may expose the metal substrate surface. These pinholes have been identified as corrosion initiation sites to be avoided.

In attempting to eliminate pinholing in autodeposition coatings on multi-metal substrates, methods and compositions have been discovered which have reduced the pinholing effect on some substrates, even though subject to somewhat sensitive process parameters and tight tolerances for the coating process. Conventionally, in order to coat the different metal substrate materials in one bath, a high level of hydrogen peroxide is used in the autodeposition bath in order to accomplish a satisfactory coating, as described in co-owned United States Patent Application Number US 2008/0160199A1, which is incorporated herein by reference in its entirety, to the extent not contradicted herein. Maintenance of high levels of peroxide in an autodeposition coating bath has some shortcomings. Conventional autodeposition coating of workpieces that have metallic substrates with different activity levels has required a very careful composition selection to achieve a defect free coating on all metals presented in the bath together. Although the tight window of success has made manufacturing possible, it has also made manufacturing more difficult, costly and time consuming. Broadening the processing tolerances is desirable for providing a higher degree of success in manufacturing thereby solving problems of re-work and scrap rate. Simplicity in coating process design and control is critical to providing value to a customer.

Highly active zinciferous metals like hot dipped galvanized, electro-galvanized or galvanneal substrates required maintenance of high levels of peroxide in the autodeposition bath to coat in a defect free manner, meaning no pinholes. Maintenance of high levels of peroxide is difficult due to self decomposition of the peroxide and wide fluctuations of the concentration during production. Even at these high peroxide levels, a few pin-holing types of defects were still visible on highly active substrates unless the peroxide concentrations are very carefully monitored to maintain them within a narrow operating concentration. Under such high peroxide concentration conditions, it is increasingly difficult to satisfactorily autodeposition coat the entire panel uniformly, complete with coatings on the raw, uncoated edges of a stamped panel. Each of the various metals, ferrous metal, hot dip galvanized, electro-galvanized or galvanneal substrates requires different concentrations of hydrogen peroxide to provide satisfactory coatings using autodeposition baths. As such, to autodeposition coat two or more of these metal substrates in a single bath under these conditions becomes even more difficult. Attempts to simultaneously coat two or more such substrates with a uniform coating have not been completely successful. Edge coating is problematic and is not always successful. In a manufacturing setting, where process control of large baths over time is very challenging, there is a strong need for new chemistries that solve the problems of pinholing and edge coverage, without the need for maintenance of high peroxide and stringent control of such parameters.

Even in a high peroxide autodeposition bath, difficulties still remain in obtaining a uniform autodeposition coating deposited in the same bath at the same time on the entirety of two dissimilar metal surfaces, for example on the steel and the zinciferous or aluminiferous metallic surfaces of a workpiece. Edge coverage is a particular problem. The narrowest edges and protuberances of a workpiece, as well as interfaces of two dissimilar metals, for example cut edges of a ferrous workpiece coated with a non-ferrous metal, e.g. zinc, zinc alloy, aluminum or aluminum alloy, still require improvement in autodeposition coating coverage. Because a unique feature of the autodeposition process is the formation of a uniform film over the entire surface of the work piece, even in difficult-to-reach areas, it is desirable that uniform coatings on multiple metal containing substrates be more easily achieved.

Therefore, for many reasons, autodeposition coating of multiple metal substrates in their manufacturing process could be made much simpler if a more forgiving autodeposition bath would be available that would uniformly coat combination multi-metal substrates, such as for example, zinciferous galvanized panel faces along with un-coated ferrous metal substrates.

SUMMARY OF THE INVENTION

In accordance with the present invention, these issues and problems are addressed by the disclosure of several aspects of new nitrogen compound containing autodeposition bath chemistries, autodeposition concentrate compositions for use in the bath, methods of making and using the concentrate and bath, as well as metal articles comprising an autodeposition coating according to the invention.

Such a new autodeposition coating bath composition was developed utilizing additives of one or more nitrogen compounds having one to two nitrogen-oxygen bonds selected such that said compounds reduce pinhole formation in autodeposition coatings formed on multi-metal surfaces or formed in autodeposition baths formulated to sequentially coat different metal surfaces having different activities in the autodeposition bath. In one embodiment, the compounds can be nitrogen containing oxidizer compositions. In another embodiment, the compounds may be nitrogen containing reducing compositions. Desirably, the compounds may comprise inorganic and/or organic nitrogen compounds having one to two oxygen atoms bonded to an individual nitrogen atom. In one aspect, the nitrogen compound may comprise nitrous acid, an inorganic $NO_2$-containing compound. In another aspect of the invention, the one or more nitrogen compounds may comprise organic NO-containing and/or $NO_2$-containing compounds.

The autodeposition coating baths of the invention are useful for coating uncoated ferrous metal surfaces, such as steel, and non-ferrous metals surfaces, such as a zinc-coated or galvanized ferrous metal, aluminum, magnesium, zinc, aluminum alloys and zinc alloys in a single autodeposition bath, while yielding a uniform coating on all of the metallic substrate surfaces. Typical examples of multi metal substrates where this invention finds utility are those recited above and in particular substrates that include as one of the metals a zinciferous metal, such as zinc, zinc coated steel (galvanized steel), and zinc rich primer coated substrates. This new coating bath provides defect-free coatings on a number of different metal substrates having different metal surfaces being coated in a single bath over a wide operating range; as well as providing good edge coating on metal workpieces comprising layers of dissimilar metals, for example the cut edge of a galvanized panel. Although the most common multi-metal substrate is a cold rolled steel substrate with a zinc coating, the present invention finds utility on many other substrates, such as aluminum and magnesium. The autodeposition coating baths of the invention are also useful in serially coating different metal surfaces having different activities in the autodeposition bath because the inventive baths allow wider tolerances in formulation parameters in the autodeposition bath while still providing uniform coatings on different metal surfaces coated. In one aspect of the invention, a coating bath composition provides a uniform, defect-free coating when dissimilar metals are coated in series in the same bath. In another aspect of the invention, a coating bath composition provides a uniform, defect-free coating when dissimilar metals are coated simultaneously in the same bath.

DETAILED DESCRIPTION OF EMBODIMENTS

This invention discloses new autodeposition coating compositions comprising at least one nitrogen compound having one to two oxygen atoms bonded to an individual nitrogen atom, such as by way of non-limiting example NO2-containing compounds and amine oxides. The autodeposition coating compositions can be made by adding the at least one nitrogen compound in several ways, such as prior to use, for example during manufacture of autodeposition compositions, or during use of an autodeposition bath, for example by addition of at least one nitrogen compound having one to two nitrogen-oxygen bonds to conventional autodeposition coating compositions or baths, such as the Aquence® autodeposition compositions commercially available from Henkel Corporation of Madison Heights, Mich. (Aquence® being a registered trademark of Henkel).

In one aspect of the invention, processes with broader operating windows for bath chemistries are provided. Conventionally, in order to even obtain autodeposition coated multi-metal substrates without pin holes, additional hydrogen peroxide was added to the autodeposition bath to coat highly active zinc-coated metals like hot dipped galvanized, electro-galvanized or galvanneal substrates, or "zinciferous" metals. Previously a concentration of 150-300 ppm of hydrogen peroxide in an autodeposition bath was required to coat hot dipped or electro-galvanized substrates. An even higher amount of hydrogen peroxide, i.e. 600-750 ppm, was required to coat galvanneal substrates. Under such high peroxide conditions, it is difficult to coat cold rolled steel in the same bath, although it was possible within a very narrow window of hydrogen peroxide. Applicants have developed a new chemistry and complementary manufacturing process to autodeposition coat both exposed steel, e.g. cold rolled steel, along with highly active metals like hot dipped galvanized, electro-galvanized or galvanneal substrates in a single bath without the use of high amounts of hydrogen peroxide and over a wide operating window of bath parameters. In one method according to Applicants' invention, Applicants have achieved a broad operating window of 101 Lineguard readings, to be maintained in autodeposition baths to provide an acceptable coating, to 60 to 350 micro amps, preferably 100 to 300 micro amps. This is much broader than the previously required range of 101 Lineguard readings to be maintained in prior autodeposition bath to provide an acceptable coating, namely 200-220 micro amps with a H2O2 concentration of 150 to 300 or 600 to 700 ppm, depending on the substrate. Moreover, in Applicants' process, the concentration of peroxide maintained in the bath can also be greatly reduced and may be in the range of 15 to 50 ppm. The described change in processing parameters shows a change from a 20 microamp range to a range of nearly 300 microamps, more than a one hundred fold broadening of the operating range. Also the reduction in peroxide required is at least 66%, from a conventional minimum of 150 ppm down to a maximum of 50 ppm, and can be as high as a 93% reduction from 700 ppm down to 50 ppm. Further, this peroxide concentration is substantially substrate independent such that series of dissimilar metal substrates and/or multi-metal substrates can be autodeposition coated in the same bath. These changes to operating parameters are significant in the manufacturing setting where operating an industrial size bath within a 20 microamp range can be extremely difficult.

In another aspect of the present invention, it has been found that nitrogen compounds having one to two nitrogen-oxygen bonds, in particular having one to two oxygen atoms bonded to an individual nitrogen atom, included in an autodeposition coating bath in a concentration of 0.01 g/liter to 50 g/liter, provide defect free coatings on combination multi-metal substrates. One or more nitrogen compounds having one to two nitrogen-oxygen bonds can be added during manufacture of an autodeposition polymeric dispersion, such as prior to polymerization or after polymerization of monomers, if present; as an additive to a autodeposition polymeric dispersion, and/or as an additive to an autodepositing bath. The nitrogen compounds having one to two nitrogen-oxygen bonds may be water soluble or water miscible. Desirably, the nitrogen compounds are selected such that upon addition coagulation, precipitation or splitting of the autodeposition composition is absent. In particular, additions prior to polymerization of any monomer are preferably in the absence of splitting or precipitation, and do not unduly interfere with desired polymerization.

Organic and inorganic nitrogen compounds having one to two nitrogen-oxygen bonds may be used, organic, nitrogen compounds being preferred. Desirably the nitrogen compounds have one to two oxygen atoms bonded to an individual nitrogen atom. Some suitable nitrogen compounds of interest, include, but are not limited to: nitroalkanes, such as nitromethane, nitroethane, or 2-nitropropane; nitrogen-containing alcohols, in particular nitroalcohols, such as 3-nitro-2-butanol, 2-nitro-1-ethanol, tris(hydroxymethyl) nitromethane, tris(hydroxymethyl) nitroethane, 2-ethyl-2-nitro-1,3 propanediol, 2-ethyl-2-nitro-1-propanol, 2-nitro-1-butanol, 2-methyl-3-nitrophenol, 2-bromo-2-nitro-1,3 propanediol, 2-methyl-2-nitro-1,3 propanediol, 2-bromo-2-nitropropane-1,3-diol, tris(hydroxymethyl) nitromethane; nitrobenzenes, optionally having substituents on the benzene ring other than a hydroxy substituent, such as 2-nitroanisole, 3-nitrobenzaldehyde and nitrobenzenesulphonates, including sodium 3-nitrobenzenesulphonate; substituted and unsubstituted nitropyridines, such as 4-methyl-3-nitropyridine; and combinations thereof. In one embodiment, the nitrogen compounds are selected from aliphatic nitroalkanes, aliphatic nitroalcohols and aromatic nitrogen compounds having no hydroxy substituents on the aromatic ring.

Similarly, amine oxide compositions find utility in the present invention, and they can be represented by the general formula $R_3N(^+)$—$O(^-)$, wherein each "R" independently may represent hydrogen or an organic group, at least one "R" being an organic group and not more than two "R" groups being hydrogen. Each organic group may independently be linear, branched or cyclic, aliphatic or aromatic; and may be, by way of non-limiting example, an alkane group, an alkyl group, an amine-substituted alkane group, an amine-substituted alkyl group, or a heterocyclic group. Each "R" group independently may have from one to eleven carbon atoms, preferably one to nine carbon atoms. Some suitable amine oxides may include, but are not limited to, 4-methyl morpholine N-oxide, isoquinoline N-oxide, N,N dimethylhexylamine-N-oxide, trimethylamine N-oxide, 3-hydroxypyridine N-oxide, 4 methoxypyridine N-oxide, pyridine N-oxide, pyridazine N-oxide, pyrazine N-oxide and mixtures of above. A similar effect can be obtained by the use of compounds containing either a nitro group and/or by the use of an amine oxide.

Some of the nitrogen compounds having one to two nitrogen-oxygen bonds, e.g. nitroethane, may function as a co-solvent or depolarizer, depending on the properties that are being sought in the final coating and may be either incorporated before polymerization as a co-solvent, added after polymerization or added to the autodeposition coating bath. The resulting autodeposition compositions and coating baths provide simultaneous deposition of defect-free autodeposition coatings on zinc coated and steel substrates using a single bath without need for hydrogen peroxide at concentrations greater than 50 ppm. In one embodiment, 2.5% nitroethane based on the weight of total solids was incorporated into an autodeposition emulsion polymer by addition as a co-solvent prior to polymerization, and provided a defect free coating achieved on both the exposed ferrous metal of a galvanized substrate, as well as the zinc coated surface. Cold rolled steel in combination with highly active metals like hot dipped galvanized, electro-galvanized or galvanneal substrate panels were also autodeposition coated in a similar bath over a wide range of bath parameters and each of the resulting coatings was defect free. Similar effects can be achieved incorporating many other nitrogen compounds having one to two nitrogen-oxygen bonds that include, but are not limited to, nitromethane, nitropropane, nitroethanol and nitrobutanol, and combinations thereof.

Basic constituents of an autodepositing bath composition are water, resin solids dispersed in the aqueous medium of the composition, optionally an oxidizing agent such as by way of non-limiting example peroxide, and an activating system, that is, an ingredient(s) which converts the water/resin composition into one which will form on a metallic surface a resinous coating which increases in thickness or weight the longer the surface is immersed in the composition. Various types of activators or activating systems are known, for example, as reported in U.S. Pat. Nos. 3,592,699; 3,709,743; 4,103,049; 4,347,172; and 4,373,050, the disclosures of which are incorporated herein by reference. The autodepositing bath and may also contain a number of additional ingredients. Such additional ingredients may include fillers, biocides, foam control agents, pigments, soluble colorants, and flow control or leveling agents, as have been previously described in the prior art.

The activating system generally comprises an acid/oxidizing system, for example: hydrogen peroxide and HF;

HNO₃; and a ferric-containing compound and HF; and other soluble metal-containing compounds (for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 g/l) and an acid that can be used alone or in combination with hydrofluoric acid, and including, for example, sulfuric, hydrochloric, nitric, and phosphoric acid, and an organic acid, including, for example, acetic, chloracetic, and trichloracetic. Desirably, the activating system comprises a ferric-containing compound and hydrofluoric acid. In one embodiment, the autodepositing composition comprises a soluble ferric-containing compound in an amount equivalent to about 0.025 to about 3.5 g/l ferric iron, most preferably about 0.3 to about 1.6 g/l of ferric iron, and hydrofluoric acid in an amount sufficient to impart to the composition a pH within the range of about 1.6 to about 5.0. Examples of the aforementioned ferric-containing compounds are ferric nitrate, ferric chloride, ferric phosphate, ferric oxide, and ferric fluoride, the last mentioned being preferred.

Useful autodepositable polymers, the source of most resin solids, can be acrylic (such as in the Henkel Series 700 autodeposition composition), styrene-acrylic, epoxy, epoxy-acrylic (such as in the Henkel Series 900 autodeposition composition), vinyl polymers (such as in the Henkel Series 800 autodeposition composition), polyurethane dispersions, or any other water dispersible conically stabilized polymer. Acrylic polymers will be understood by those of skill in the art to include polymers containing acrylic acid, methacrylic acid, acrylic ester, and methacrylic ester based monomers, and mixtures thereof. Vinyl polymers will be understood by those of skill in the art to mean vinyl acetate, vinyl carbonates and vinyl ester polymers, for example polyvinylidene halogen esters, such as polyvinylidene chloride. All autodepositable polymers are useful in the invention, whether they are a mini-emulsion or a non-mini-emulsion derived. The nitrogen compounds work with non-mini-emulsion polymers as well as the mini-emulsion polymers. Some autodepositable polymers are commercially available and methods of preparation of autodepositable polymers are known in the art.

To illustrate ways in which the nitrogen compounds of the invention may be introduced into autodeposition compositions of the invention, a description of aspects of preparation of such autodeposition compositions and autodepositable polymers is provided. For pre-made or commercially available autodepositable polymers, preparation of an autodepositable polymeric dispersion may be as simple as dispersing the autodepositable polymer with surfactant and/or coalescing agent to a desired particle size. Other preparation methods may include polymerization of resin and/or monomer components of a to-be-produced autodepositable polymer, which methods are known. Generally, autodepositable polymeric dispersions are made by preparing a solution or mixture of resin and/or monomer, optionally in organic solvent(s). Oligomers may also be included. The resulting "resin and/or monomer mixture" is dispersed in water with surfactant, mechanically dispersed to a desired particle size to form a "resin and/or monomer dispersion". The resin and/or monomer dispersion may be optionally emulsified, for example by known mini emulsion processes; and optionally polymerized. Typically, any dispersion comprising monomer will undergo the polymerization step, and prior to polymerization will be referred to herein as a "blend" and after polymerization will be referred to as a "polymeric dispersion". The resulting composition yielded is an autodepositable polymeric dispersion.

The resulting autodepositable polymeric dispersion may be mixed with other components to form a storage stable autodeposition concentrate composition and/or be used as a component of an autodeposition coating bath. The autodeposition coating bath forms an autodeposited polymeric coating on active metal surfaces when the metal surfaces are contacted with the autodeposition bath and cured, optionally with cross-linking of the autodepositable polymer. Because a high concentration of solvent is undesirable in an autodepositing coating bath, solvent-containing dispersions may be subjected to distillation techniques known in the art to remove solvent.

One or more nitrogen compounds having one to two nitrogen-oxygen bonds according to the invention can be added at one or more of the following points:
    during manufacture of an autodeposition polymeric dispersion, such as
        if a polymerization reaction is conducted
            prior to polymerization or
            after polymerization;
        if a polymerization reaction is not needed or conducted (e.g. starting with a resin that has sufficient molecular weight such that additional polymerization is optional);
    as an additive to an autodepositable polymeric dispersion;
    as an additive to an autodeposition composition in the absence of activator, e.g. a concentrate; and/or
    as an additive to an autodeposition composition in the presence of activator, e.g. an autodepositing bath, either prior to or during use.

The amount of nitrogen compound according to the invention to be added to at various points as outlined above can be any desired amount provided that it does not interfere with manufacture or result in instability such as coagulation. The nitrogen compounds may be added at one or more points in time as described above to achieve an concentration in the autodeposition bath sufficient to achieve the benefits of the invention.

The present invention will be more readily understood by the following description of one embodiment wherein nitrogen compounds of the invention are added during manufacture of an autodepositable polymeric dispersion involving polymerization. The epoxy resin-ethylenically unsaturated monomer blend (hereinafter referred to as epoxy-monomer blend), which will be recognized as an example of a resin and monomer dispersion, including the building blocks for an epoxy-acrylic copolymer as the autodepositable polymer in the resulting autodepositable polymeric dispersion. The nitrogen compound or compounds may be added at one or more of several process steps as described herein prior to contacting to-be-coated substrates.

In one embodiment, epoxy resin-ethylenically unsaturated monomer blends according to the invention are made by dissolving or/and dispersing at least one epoxy resin in at least one liquid ethylenically unsaturated monomer, optionally with latent cross-linker and/or coalescing agent, to form an epoxy-monomer blend. A nitrogen compound having one to two nitrogen-oxygen bonds may be added in this process before polymerization to form an autodepositable polymeric epoxy dispersion, adding a nitrogen compound having one to two nitrogen-oxygen bonds after polymerization to the epoxy dispersion and/or adding a nitrogen compound having one to two nitrogen-oxygen bonds to an autodeposition working bath containing the epoxy dispersion. Examples are included to provide disclosure of the full range of methods of applicable nitrogen compound having one to two nitrogen-oxygen bonds modifications. It will be understood by those of skill in the art that the methods of adding the nitrogen compound having one to two nitrogen-oxygen bonds described for this embodiment can be employed with minor modification, if any, when using the other autodeposition polymers, disclosed above.

In accordance with one aspect of the invention, a process for making an autodepositable polymeric epoxy dispersion with at least one nitrogen compound having one to two nitrogen-oxygen bonds included before polymerization comprises the steps of:
(a) dissolving an epoxy resin with at least one ethylenically unsaturated monomer to form a mixture and adding a nitrogen compound having one to two nitrogen-oxygen bonds and any optional components, e.g. curing agent, coalescing agent and/or chain transfer agent;
(b) dispersing the mixture of step (a) in water, optionally with surfactant, to form a crude particle dispersion, mechanically dispersing same to form a mini-emulsion; and
(c) polymerizing the at least one ethylenically unsaturated monomer contained in the mini-emulsion to form an autodepositable polymeric epoxy dispersion.

Any of the afore-described nitrogen compounds having one to two nitrogen-oxygen bonds may be added prior to polymerization, provided that the additive does not cause precipitation, does not interfere with polymerization of the at least one ethylenically unsaturated monomer or destabilize the emulsion. Alternately, the nitrogen compound having one to two nitrogen-oxygen bonds may be added after the polymerizing, as described more fully hereinbelow. The term "autodepositable polymeric epoxy dispersion" as used herein means the dispersion resulting from either non-mini-emulsion or mini-emulsion polymerization of the epoxy resin-ethylenically unsaturated monomer blend. It will be understood by those of skill in the art that at least some of the nitrogen compound having one to two nitrogen-oxygen bonds present in the autodepositable polymeric epoxy dispersion may be incorporated into the organic dispersion particles. The type and concentration of epoxy resin and ethylenically unsaturated monomer used can be varied to achieve specific performance properties including defect free coatings providing corrosion resistance, and flexibility on the surfaces of the substrate as well as continuous edge protection coatings. The type and concentration of ethylenically unsaturated monomer used can also be exploited as a means to provide improved compatibility with various pigmentation types.

Epoxy resins useful in the present invention can be based on one or more epoxy resins which contain one or more hydroxyl groups. Such epoxy resins are well known substances and are described, for example, in the chapter entitled "Epoxy Resins" in Volume 6 of The Encyclopedia of Polymer Science and Engineering (Second Edition). Methods of use according to the invention are based on epoxy resins that contain within the same molecule: (i) one or more epoxide groups as well as (ii) one or more hydroxyl groups. Preferably, the epoxy resin used contains one or more hydroxyl groups and approximately two epoxide groups per molecule.

Epoxy resins are often described by the type of central organic moiety or moieties to which the 1,2-epoxy moieties are attached. Non-exclusive examples of such central moieties are those derived from bisphenol A, bisphenol F and their analogs in which one or two —$NH_2$ moieties are substituted for an equal number of —OH moieties in the bisphenol; novolac condensates of formaldehyde with phenol and substituted phenols and their amino analogs, the condensates containing at least two aromatic nuclei; triazine; hydantoin; and other organic molecules containing at least two hydroxyl and/or amino moieties each, in each instance with as many hydrogen atoms deleted from hydroxy and/or amino moieties in the parent molecule as there are epoxy moieties in the molecules of epoxy resin. Optionally, the 1,2-epoxide moieties may be separated from the central moieties as defined above by one or more, preferably only one, methylene groups. Oligomers of such monomers, either with themselves or with other organic molecules containing at least two hydroxyl and/or amino moieties each, may also serve as the central organic moiety.

Epoxy resins useful for the present invention include glycidyl ethers of a polyhydric phenol, such as bisphenol A (a particularly preferred species of polyhydric phenol), bisphenol F, bisphenol AD, catechol, resorcinol, and the like.

Primarily for reasons of economy and commercial availability, it is generally preferred to utilize epoxy resins derived from bisphenol A in this invention. More particularly, epoxy moiety containing molecules utilized in this invention preferably conform to the general chemical formula:

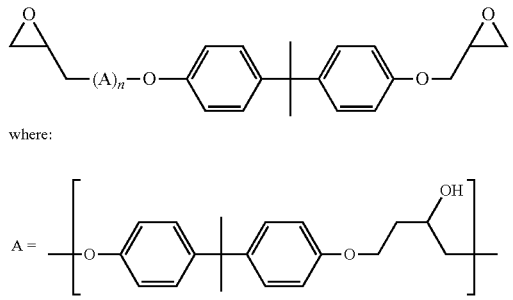

where:

and "n" is an integer from 0 to 50. If such epoxy resins are to be used directly as the resin component of the present invention, "n" is preferably an integer within the range from about 1-30 so that each molecule contains at least one hydroxyl group. Commercially available epoxy resins of this type are normally mixtures of molecules having somewhat different "n" values and different numbers of epoxy groups. Preferably, the epoxy resin mixture used has a number average molecular weight in the range of from about 350 to about 5,000, more preferably in the range from about 400 to about 3000. Preferably, the average number of epoxide groups per molecule in the epoxy resin mixture is in the range from 1.7 to 2.5, more preferably in the range from 1.9 to 2.1. The epoxy resin mixture may contain resin molecules in which n=0.

Other suitable epoxy resins may include chain-extended epoxy resins as well as flexibilizing epoxy resins. In the former, a chain extender is utilized to react individual epoxy resin molecules through their epoxy groups so as to form a polymer which is higher in average molecular weight than the starting epoxy resin(s). A "flexibilizing epoxy resin" may be defined as an epoxy resin which when cured by itself with diethylene triamine (DETA) has a durometer Shore D reading not greater than 45. Suitable flexibilizing epoxy resins include those compounds containing at least one epoxide group per molecule and one or more groups capable of increasing the flexibility of the cured autodeposited coating such as, for example, long aliphatic chains (e.g., polymethylene chains corresponding, for example, to the structure —$(CH_2)_n$— wherein "n" is preferably greater than 3, more preferably greater than 6. The polymethylene chains can be in the backbone of the flexibilizing epoxy resin and/or pendent thereto), polyester chains (especially those formed by condensation of aliphatic diacids and glycols or glycol oligomers), polyoxyalkylene chains (e.g., polyether chains corresponding to the structure $((CH_2)_n$—CHR—O-)m-, where: "n" is 0-3, "m" is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350.

Suitable ethylenically unsaturated monomers include, but are not limited to, vinyl aromatic hydrocarbons such as styrene and substituted styrenes, vinyl aliphatic hydrocarbons, ethylenically unsaturated acids such as acrylic and methacrylic acid as well as alkyl and hydroxyl-alkyl esters of such acids. Non-exclusive examples include butyl acrylate, methyl methacrylate, and hydroxyethyl methacrylate. Acrylonitrile, methacrylonitrile, acrylamide, and methacrylamide are also suitable. Combinations of any of the above monomers may find utility as well.

Ethylenically unsaturated monomers with anionic functionality are typically used. Anionic functional monomers, when co-polymerized into an emulsion or aqueous solution polymers, provide a "bound" source of ionic charges to effectively stabilize the emulsion polymer particles both during polymerization and subsequent formulation into autodeposition compositions. One advantage offered is to minimize or eliminate the use of an external surfactant. In addition, these anionic functional monomers may provide a "bound" source of sulfate or sulfonate groups to the polymer necessary for autodeposition film formation to occur. Examples of suitable anionic functional monomers include, but are not limited to, 2-sulfoethyl methacrylate, 2-acrylamido-2-methylpropanesulfonic acid, styrene-sulfonic acid, vinylphosphonic acid, phosphate monomers such as PAM-100 and PAM-200 phosphate ester monomers available from Rhodia and corresponding salts of these monomers.

In one embodiment, phosphate monomers such as PAM-100 and PAM-200 available from Rhodia and corresponding salts of these monomers can be used as a portion of the ethylenically unsaturated monomer. The use of phosphate monomers such as PAM-100 and PAM-200 can provide improvements in mechanical and adhesive properties. It is generally preferred for the phosphate monomer(s) to be added after dispersion of the epoxy resin and ethylenically unsaturated monomer and before or during polymerization of the monomer.

In another aspect of the present invention, hydroxyl functional ethylenically unsaturated monomer may be used. The use of hydroxyl functional ethylenically unsaturated monomer provides for a dispersion that has greater solvent resistance when used in conjunction with hydroxyl reactive crosslinking or curing agents. Non-exclusive examples of hydroxyl functional ethylenically unsaturated monomer include 2-hydroxyl methacrylate, hydroxyl acrylate, and hydroxylpropyl methacrylate.

The dispersions and coating compositions of the present invention may also contain one or more substances capable of reacting with the polymer end product to provide a crosslinked polymeric matrix in the cured coating. In one embodiment of the invention, at least a portion of the curing agents (sometimes referred to as crosslinking agents) only react with the autodepositable polymeric epoxy dispersion end-product at the elevated temperatures typically encountered during the curing stage of the composition. Such curing agents are often referred to in the art as "latent" curing agents or hardeners because they only become activated when heated to a temperature well in excess of normal room temperature. The use of latent curing agents is preferred in the present invention so that substantial cross linking of the epoxy resin or epoxy pre-polymer may be avoided prior to and during deposition on the surface of an article. In the case of metallic articles the deposition is typically carried out at temperatures of from about 20° C. to about 60° C. However, if so desired, minor amounts of more reactive curing agents may also be present in addition to the latent curing agents so as to accomplish partial crosslinking prior to deposition on an article. In one embodiment of the invention, at least one latent curing agent such as, for example, a blocked isocyanate is incorporated into the mixture before the at least one ethylenically unsaturated monomer is polymerized. Preferred blocked isocyanates comprise moderately reactive isocyanates such as aliphatic isocyanates and more sterically hindered and/or more acid stable blocking groups, such as those derived from the lactam of 6-aminohexanoic acid and/or benzotriazole. Typical stoving temperatures for such crosslinking agents are at or above 160° C. Utilization of such crosslinking agents avoids premature crosslinking from occurring during the polymerization process where temperatures are typically between ambient temperature and 100° C. Vestagon B1530 from Degussa Corporation is one representative example.

The preferred crosslinking agents are generally selected so as to be capable of reacting with the hydroxyl groups and/or intact epoxide groups, which are present in the epoxy resin and/or ethylenically unsaturated monomer. Hydroxyl groups are inherent to epoxy resins as hydroxyl is formed upon ring opening of the epoxide, independent of whether this ring opening occurs in the advancement of the epoxy resin, or by reaction of residual epoxy with acids such as HF in the coating bath. Hydroxyl groups can also be imparted if hydroxyl functional ethylenically unsaturated monomer is used.

Suitable crosslinking agents used in the present invention react with epoxide or hydroxyl moieties on the reactive epoxy-acrylic polymer in the autodepositable polymeric epoxy dispersion at the elevated temperatures found in the curing stage of the process, e.g., at least 100° C. The preferred crosslinking agents are believed to be reactive with hydroxyl groups as well as with any intact epoxide groups that may still be present in epoxy-acrylic polymer once it has been placed in the relatively acidic environment of an autodeposition bath composition. Most, so or all, of such epoxide groups are believed likely to be hydrolyzed to produce hydroxyl groups. Furthermore, even if epoxy groups remain as such, there will normally be at least some hydroxyl groups available for crosslinking reactions such as esterification, etherification, and urethane formation.

Crosslinking agents are preferably molecules that are capable of rapid chemical addition reactions with epoxy and/or hydroxyl only when heated, but which exhibit little or no reactivity towards such moieties at temperatures preferably of 100° C., 120° C., 130° C., 140° C., 150° C. Such crosslinking agents are sometimes referred to in the art as latent curatives. Examples of suitable crosslinking agents include (a) molecules that contain: at least two epoxy and/or hydroxyl-reactive functional groups, such as thiol, hydroxyl, carboxyl, and carboxylic acid anhydride, and (b) molecules that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature in excess of 100° C. The blocking groups can be derived from any suitable aliphatic, cycloaliphatic, aromatic, or alkylaromatic monoalcohol, monoamide, monoamine, or monoxime. Ketoximes are useful when unblocking at relatively low temperatures such as 120° C. is desired. More sterically hindered and/or more acid stable blocking groups, such as those derived from the lactam of 6-aminohexanoic acid and/or benzotriazole are preferred if unblocking is desired to begin at a substantial rate only at or above 160° C. The use of isophorone diisocyanate-based, epsiloncaprolactam blocked isocyanates as crosslinker is particularly preferred. If a blocked isocyanate-type crosslinker is utilized, the ratio of blocked isocyanate groups to hydroxy groups (NCO:OH) typically will be in the range of about 0.05 to about 1.2, more preferably about 0.1 to about 0.5. Other examples include blocked hexamethylene diisocyanates (HMDI).

Generally, the presence of a coalescing agent component in an autodeposition composition according to the invention is preferred. This component is preferably selected from the group consisting of monoethers and monoesters of glycols, preferably glycols with at least one terminal hydroxy group. Monoethers of ethylene glycol are readily available and effective in blistering reduction but are restricted in use by antipollution laws in many locations and also have been found to be more likely than monoethers of propylene glycol to destabilize the emulsions formed in products according to the invention, such that monoethers of propylene glycol, particularly the n-butyl and phenyl monoethers of propylene glycol, are preferred from this class. When glycol monoethers are used, their percentage in an autodepositing liquid composition according to the invention preferably is within the range from about 0.5 to about 30, preferably about 18 to 26% of the total solids in the composition.

As coalescing agents, monoesters are slightly less preferred than monoethers where maximum corrosion resistance in the final product is needed, but are generally effective at lower concentrations and may therefore be preferred if economy and/or compliance with stringent solvent emission standards is more important than maximum corrosion resistance. A particularly preferred monoester is 2,2,4-trimethyl-1,3-pentanediol mono 2-methyl propionate. This and other monoesters if used preferably are present in an amount of at least 0.5% of the total autodepositing liquid composition and more preferably are present in amounts of about 1-10, and preferably about 2.5-5%.

Dispersion of an epoxy resin or epoxy pre-polymer (hereinafter referred to as epoxy), and ethylenically unsaturated monomer, in water can be accomplished by procedures known in the art. In one embodiment, the dispersion of the epoxy and ethylenically unsaturated monomer in water is accomplished by emulsification. Emulsification of the epoxy and ethylenically unsaturated monomer in water may be accomplished by any of the emulsification procedures known in the art. The desired result is a fine particle dispersion of epoxy and ethylenically unsaturated monomer containing micelles. In this aspect of the invention, desired nitrogen compounds having one to two nitrogen-oxygen bonds and additives may be emulsified with the epoxy and ethylenically unsaturated monomer, or may be added after the emulsion is formed.

In this aspect, the emulsification procedure involves a two-stage process in which a solution of the epoxy, ethylenically unsaturated monomer, and any added components, including the nitrogen compound having one to two nitrogen-oxygen bonds is emulsified in water to form a crude dispersion of epoxy and ethylenically unsaturated monomer containing micelles. The crude dispersion is then mechanically dispersed to form a fine particle dispersion. Thus, the crude dispersion may be subjected to at least one particle size refinement stage. For example, the crude dispersion can be subjected to at least one particle size refinement stage in which the crude dispersion is forced through a narrow aperture to form the fine particle dispersion.

In this aspect, the epoxy, ethylenically unsaturated monomer, and any added components is microfluidized or homogenized in a microfluidizer or homogenizer having a chamber pressure of from about 6,000 psi to about 15,000 psi. As used herein, "microfluidized" and "homogenized" refer to a mechanical process for reducing the size of the fine particle dispersion of the combination of the epoxy, ethylenically unsaturated monomer, and any added components, including our nitrogen compound having one to two nitrogen-oxygen bonds. The combination of the epoxy, ethylenically unsaturated monomer, and any added components form droplets in the water. The average diameter of the droplets is from about 1 to 10 microns prior to microfluidization or homogenation. The average diameter of the epoxy, ethylenically unsaturated monomer, and any added components droplets is reduced from the size while in crude dispersion to less than about 1 micron during microfluidization or homogenization. Preferably, the average diameter of the droplets is reduced to about 0.01 to about 0.5 microns during microfluidization or homogenation. During the microfluidization, the mixture containing the epoxy, ethylenically unsaturated monomer, and any added components with the water is preferably passed through small channels under a pressure of from about 8,000 psi to about 12,000 psi at a speed of approximately 700 ft/sec. The interaction intensity, which may involve shear, impingement, distention, and/or cavitation forces, on the mixture with the microfluidizer or homogenizer controls the size and distribution of the droplets in the mixture and ultimately the polymer particle size.

A preferred microfluidizer is available from Microfluidics Corporation. In the microfluidizer, a mixture is pumped into a specially designated chamber in which fluid sheets interact at ultrahigh velocities at pressures up to 1500 ft/second and 16,000 psi, respectively. The fixed microchannels within the chamber provide an extremely focused interaction zone of intense turbulence causing the release of energy amid cavitation and shear forces. Most preferably, the microfluidizer is set at 8,000 to 12,000 psi chamber pressure.

In another aspect, an emulsifying agent, such as a surfactant, may be used to further or aid in the formation of the dispersion in water. Anionic surfactants are generally preferred, although amphoteric or nonionic surfactants may also be utilized. Combinations and mixtures of different surfactants may be employed. One class of preferred anionic surfactants for use in the present invention are ether sulfates that conform to general formula:

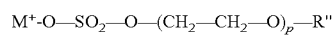

wherein: M represents a monovalent cation or monovalent fraction of cation of a higher valence, preferably, sodium or ammonium, and more preferably ammonium; p is a positive integer that preferably is between 2 and 7; and R" represents an alkyl or alkylaryl moiety, more preferably an alkyl phenol moiety. Independently, R" preferably has 8 to 30 carbon atoms, and more preferably has from 15 to 20 carbon atoms. Other suitable commercially available anionic emulsifiers include Dowfax™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate), and. Polystep™ B40 from Stepan. Preferred anionic emulsifying agents are salts of lauryl sulfate. The preferred amount of active anionic emulsifying agent is from about 0.1 to about 5 wt % based on the weight of the total composition of solids and is preferably from about 0.7 to about 2 wt %. A polymerizable anionic surfactant may be used to further or aid in the formation of the dispersion in water. Polymerizable anionic surfactants are widely known in the industry. Requirements for polymerizable anionic surfactants used in the present invention are that they should possess an anionic surfactant structure in addition to being a group capable of participating in radical polymerization. Binding the surfactant to the polymer in the dispersion improves stability and reduces levels of free surfactant required. Non-exclusive examples of polymerizable anionic surfactants may include sodium allyloxy hydroxypropyl sulfonate, and propenyl modified nonylphenol ethoxylate sulfate salts such as Hitenol A-10™, Hitenol BC-10™ and Hitenol BC-05™ (all products of DKS International, Inc.). Their Hitenol BC-10™ and Hitenol BC-05™ salts are particularly preferred.

Essentially any type of free radical generator can be used to initiate polymerization of the monomers. For example, free radical generating chemical compounds, ultraviolet light or radiation can be used. A chemical radical initiator may be added to facilitate the polymerization of the ethylenically unsaturated monomer within the epoxy containing micelle of the dispersion. Relative degrees of grafting, if any, between epoxy and polymerized monomer can be achieved to provide for specific molecular weights and specific performance ends by careful selection of the initiator type. Initiators may be added at various points in the process of forming the dispersion. In one aspect, the initiator is organic soluble and is introduced in the organic phase prior to dispersion of the epoxy and ethylenically unsaturated monomer in water. In another aspect, the initiator is water-soluble and is introduced after dispersion of the epoxy resin/ethylenically unsaturated monomer mixture in water. In yet another aspect, both organic soluble initiators and water-soluble initiators are added. In yet a further aspect, an organic soluble initiator is introduced after the aqueous dispersion is formed. In this aspect, the organic soluble initiator may be either added directly or may be dissolved in a co-solvent and dripped into the dispersion.

Non-exclusive examples of suitable organic soluble initiators include peroxides, peroxy esters as well as organic soluble azo compounds. Benzoyl peroxide is one preferred example. Non-exclusive examples of suitable water-soluble initiators include hydrogen peroxide, tert-butyl peroxide, t-butyl peroxtoate, hydroperoxides such as t-butyl hydroperoxide, alkali metal (sodium, potassium or lithium) or ammonium persulfate; azo initiators such as azobisisobutyronitrile or 2,2'-azobis(2-amidinopropane)dihydrochloride; or mixtures thereof. Ammonium persulfate and Vazo 68 WSP (Available from E.I. DuPont de Nemours) are two preferred examples. In one aspect, such initiators may also be combined with reducing agents to form a redox system. Non-exclusive examples of reducing agents may include sulfites such as alkali metal meta bisulfite, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Non-exclusive examples of redox systems include: t-butyl hydroperoxide/sodium formaldehyde sulfoxylate/Fe(III); t-butyl hydroperoxide/isoascorbic acid/Fe(III); and ammonium persulfate/sodium bisulfite/sodium hydrosulfite/Fe(III). In another aspect, in the absence of peroxides, sodium formaldehyde sulfoxylate may be used to initiate polymerization in conjunction with at least one anionic surfactant, such as sulfates and sulfonates. Incorporation of anionic end groups resulting from this method provides an increased level of stability for the emulsion as well as the corresponding autodeposition bath. Nonylphenol ethoxylate sulfate ammonium salt and sodium lauryl sulfate are two suitable non-exclusive examples.

In another aspect, the polymerization of the ethylenically unsaturated monomer is carried out with applied heat. A wide variety of temperatures can be employed and the specific optimum temperature varies with each initiator. Generally, persulfates are processed at a temperature from about 75 to about 90° C. Process temperatures for peroxides and azo compounds are generally chosen such that the half-life decomposition rate falls from about 1 to about 120 minutes. Alternatively, redox initiation methods are widely known in the art by which polymerization can be conducted at ambient or near ambient conditions.

A solvent may be used as a medium for combining the epoxy resin, ethylenically unsaturated monomer, crosslinking agent(s), and added components. The solvent component is not believed in most cases to contribute any desirable characteristic to the final autodeposition compositions. The solvent component may be removed from the emulsion by distillation under reduced pressure. However, in many cases the solvents do not diminish the technical benefits of the final autodeposition compositions according to the invention and may be left in place in the autodeposition composition. Any such residual solvent will normally be expelled during the elevated temperatures found in the curing stage at the end of the autodeposition process. Optional solvents are mixtures of (i) aromatic hydrocarbons with from 6 to 10 carbon atoms and (ii) ketones with from 3 to 8 carbon atoms. Preferably, the amount of solvent used to mix the materials is at least 10 wt % of the combined weight of the components without water. The most preferred solvents are toluene and methyl isobutyl ketone (MTBK). Distillation that effects the removal of the nitrogen containing compound as described herein from the autodepositable polymeric epoxy dispersion should be avoided so as to obtain the full benefit of the invention. Distillation that allows retention of an effective amount of the nitrogen containing compound can be utilized.

Alternatively, the nitrogen compound having one to two nitrogen-oxygen bonds may be added to the autodepositable polymeric epoxy dispersion post-distillation, an autodeposition composition concentrate, or an autodeposition working bath, provided that the nitrogen compound does not cause separation or adversely affect stability of the mixture.

In accordance with yet another aspect of the present invention, as embodied and broadly described herein, a process for making an autodepositable polymeric epoxy dispersion with at least one nitrogen compound having one to two nitrogen-oxygen bonds included after polymerization comprises the steps of:
(a) forming an epoxy resin-ethylenically unsaturated monomer blend;
(b) dispersing the mixture of step (a) in water with at least one surfactant to form a fine particle dispersion; and
(c) polymerizing the at least one ethylenically unsaturated monomer contained in the fine particle dispersion to form an autodepositable polymeric epoxy dispersion, wherein at least one water soluble initiator and/or at least one organic soluble initiator may be added prior to step (c) and (d) adding a nitrogen compound having one to two nitrogen-oxygen bonds after polymerization.

The afore-described procedure allows for optional distillation of solvent after polymerization without the loss of the nitrogen containing compound. The autodepositable polymeric epoxy dispersion may be used to form an autodeposition concentrate composition or may be used as a autodeposition bath component. The nitrogen containing compound may be added any time after polymerization, i.e. before, with or after the addition of further ingredients used in generating an autodeposition concentrate composition.

Generally, an autodeposition concentrate composition according to the invention comprises a nitrogen compound having one to two nitrogen-oxygen bonds, a autodepositable polymeric dispersion, e.g. an autodepositable polymeric epoxy or other suitable dispersion, in water and may also contain a number of additional ingredients. Such additional ingredients may include fillers, biocides, foam control agents, pigments, soluble colorants, and flow control or leveling agents. The compositions of these various components may be selected in accordance with the concentrations of corresponding components used in conventional autodeposition compositions, such as those described in U.S. Pat. Nos. 5,500,460, and 6,096,806 and U.S. Ser. No. 09/578,935, the teachings of which are hereby incorporated by reference.

The additional ingredients may generally be selected for compositions according to this invention from materials established as satisfactory for similar uses in other autodepositing liquid compositions. Suitable materials include carbon black, phthalocyanine blue, phthalocyanine green, quinacridone red, hansa yellow, and/or benzidiac yellow pigment, titanium dioxide and the like; oxidizer and acid stable ingredients being preferred. Suitable flow control additives or leveling agents include, for example, the acrylic (polyacrylate) substances known in the coatings art such as the products sold under the trademark MODAFLOW™ by Solutia, as well as other leveling agents such as BYK-310™ (from BYK-Chemie), PERENOL™ F-60 (from Henkel), and FLUORAD™ FC-430 (from 3M).

In another aspect of the invention, an autodeposition coating bath composition is provided that comprises a nitrogen containing compound as described herein. The nitrogen containing compound may be added as a separate addition to the coating bath or may be included in a concentrate, make-up or replenisher composition. The amount of nitrogen containing compound present in the bath is the amount effective to produce a pinhole free autodeposition coating on a galvanized steel substrate independent of peroxide level. Desirably, edge coverage of a galvanized steel substrate is uniform with other portions of the substrate. The concentration of the nitrogen containing compound in the autodeposition coating bath composition is desirably at least 0.01, 0.02, 0.03, 0.04, 0.05, 0.10, 0.25, 0.50, 0.75, 1.0, 1.5, 2.0, 2.5, 3.0 g/l and can be as high as the solubility limits of the nitrogen containing compound in the bath, provided that the amount is not so great as to destabilize the bath or negatively affect coating characteristics, such as corrosion performance or physical properties. If only for economic reasons, the upper concentration limit of the nitrogen containing compound in the coating bath desirably is not more than 50, 45, 40, 35, 30, 25, 20 g/l.

To prepare an autodeposition coating bath composition suitable for coating a multi-metallic substrate by autodeposition, the autodepositable polymeric dispersion with nitrogen compound having one to two nitrogen-oxygen bonds described hereinabove, may be combined with at least one autodeposition accelerator component, which is capable of causing the dissolution of active metals (e.g., iron) from the surfaces of the multi-metallic substrate in contact with the bath composition. Preferably, the amount of accelerator present is sufficient to dissolve at least about 0.020 gram equivalent weight of metal ions per hour per square decimeter of contacted surface at a temperature of 20° C. Preferably, the accelerator(s) are utilized in a concentration effective to impart to the bath composition an oxidation-reduction potential that is at least 100 millivolts more oxidizing than a standard hydrogen electrode. The autodeposition accelerator component is preferably chosen from the group consisting of hydrofluoric acid and its salts, fluorosilicic acid and its salts, fluorotitanic acid and its salts, ferric ions, acetic acid, phosphoric acid, sulfuric acid, nitric acid, hydrogen peroxide, peroxy acids, citric acid and its salts, tartaric acid and its salts, or combinations thereof. More preferably, the accelerator comprises: (a) a total amount of fluoride ions of at least 0.4 g/l, (b) an amount of dissolved trivalent iron atoms that is at least 0.003 g/l, (c) a source of hydrogen ions in an amount sufficient to impart to the autodeposition composition a pH that is at least 1.6 and not more than about 5, and, optionally, (d) hydrogen peroxide.

Hydrofluoric acid is preferred as a source for both the fluoride ions as well as the proper pH. Ferric fluoride can supply both fluoride ions as well as dissolved trivalent iron. Accelerators comprised of hydrofluoric acid and $FeF_3$ are especially preferred for use in the present invention.

A coating process according to this invention will preferably comprise the steps of: (a) contacting an article having a multi-metal active surface with the afore described autodeposition composition including a nitrogen compound having one to two nitrogen-oxygen bonds for a sufficient time to cause the formation of a film of the autodepositable polymeric dispersion (which film may also contain certain other components, such as a crosslinker, in the autodeposition bath composition, to a predetermined thickness on the multi-metal surface, (b) removing the coated multi-metal surface from the autodeposition bath composition, (c) rinsing the coated multi-metal surface to remove at least some of the absorbed but otherwise unadhered components of the bath composition from the more adherent portion of the coating, and (d) heating the coated article to form a cured coating on the article.

In one aspect of the invention nitrogen, from one or more of the nitrogen compounds having one to two nitrogen-oxygen bonds in the autodeposition bath, is contained in the autodeposition coating deposited on the metal surface.

Ordinarily a metal surface may be degreased and rinsed with water before applying an autodeposition composition. Conventional techniques for cleaning and degreasing the metal surface to be treated according to the invention can be used for the present invention, for example alkaline and/or acid cleaning. The rinsing with water can be performed by exposure to running water, but will ordinarily by performed by immersion for from 10 to 120 seconds, or preferably from 20 to 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred.

Preferably, contact between an active metal surface and the autodeposition bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns).

Optionally, a reagent capable of causing additional desirable reactions in or modifications of the coated film may be included in the post-coating water rinse. Such a reagent may also be brought into contact with the wet coated film after rinsing with water alone. Although the autodeposition bath compositions of the invention generally produce wet coated films that can be heated after simple rinsing with tap or deionized water to give good quality final films, the corrosion resistance of the cured coating may be further improved by rinsing with an aqueous solution comprising reaction rinses containing one or more of phosphoric acid, hexafluorometallate acids or salts, an alkaline earth metal compound such as calcium nitrate. See for example co-owned U.S. Pat. No. 6,613,387 incorporated herein by reference in its entirety.

Final heating of the rinsed wet coated and optionally post-treated autodeposited film is preferably at a temperature of greater than 100° C. The curing temperature must be sufficiently high so as to effect reaction of any latent crosslinker with the epoxy- and hydroxyl-reactive functional groups of the autodepositable polymeric epoxy dispersion present in the autodeposited film. Generally, the final heating temperature is selected to dry and cure the coating at a temperature within the range from at least about 100° C. to about 250° C., more preferably between about 130° C. and 240° C., for a time of about 3 to about 60 minutes, more preferably for about 10 to about 30 minutes.

The heating can be performed in multiple stages, if desired. For example, the coated substrate may be heated in one or more of the following steps:

To a peak metal temperature of about 27° C. to about 100° C.;

To a peak metal temperature of about 27° C. to about 150° C.; and/or

To a peak metal temperature of about 100° C. to about 250° C.;

In one embodiment, in a first stage lasting from about 5 to about 15 minutes, the coated substrate is heated to a peak metal temperature of about 55° C. to about 65° C. to flash off most of the residual water in the coating and in a second stage lasting from about 30 to about 50 minutes, the coated substrate is heated to a peak metal temperature of about 175° C. to about 250° C. The peak metal temperature preferably is attained in preferably, no more than about 10 minutes after the first heating stage has been completed.

Coatings according to the invention are also compatible with co-cure processes wherein a paint is applied to a dewatered uncured autodeposited coating and the two layers are cured together, see for example WO 2009088993.

In these operations, the metal surfaces to be autodeposition coated can be ferrous metal, such as steel; non-ferrous metal, such as a aluminum, magnesium, and zinc; and alloys thereof. Zinc and zinc alloy substrates as well as zinc-coated, galvanized and galvannealed ferrous metal, and zinc-containing coatings are collectively referred to as "zinciferous metals". Interfaces of dissimilar metals typically occur at joined panels of an assembly, for example an automotive assembly, and may occur at edges of metal workpieces comprising layers of dissimilar metals, for example the cut edge of a zinc or zinc alloy coated steel panel. Dissimilar metals will be understood by those of skill in the art to mean two metals that are "active metals" as described above, but having different metallurgical compositions such that the metals have different activity levels.

The invention finds use in a variety of industries and is useful in coating active metal parts and particularly portions of various components such as automobile sheet components, such as doors, hoods, fenders and even entire assembled chassis, as well as automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e.g., filing cabinets, filing shelves, desks, etc.

Other than in the operating examples, or where otherwise indicated, all numbers expressing quantities of ingredients, reaction conditions, or defining ingredient parameters used herein are to be understood as modified in all instances by the term "about". Unless otherwise indicated, all percentages are percent by weight. The benefits of the present invention may be more fully appreciated after considering the following examples, which are given to provide further explanation, and not to unduly limit the scope of the invention.

EXAMPLES

Example 1

Post-Polymerization Addition of Nitroethane

A modified autodeposition coating bath was prepared as follows: In a one (1) liter container, 130.21 grams of Aquence® 930 Make-up (an autodeposition coating concentrate described as a water-based dispersion of epoxy/acrylic copolymer, blocked cross-linker and carbon black pigment available from the Surface Technologies Division of Henkel Corporation) was mixed with 15.0 grams of Aquence® Starter 300 (a product containing autodeposition accelerators and other components available from the Surface Technologies Division of Henkel Corporation), 854.8 grams of deionized water, 0.027 grams HF and 2.0 grams of nitroethane.

The bath was mixed for one (1) hour and the bath was maintained under agitation at all times. No coagulation, separation or precipitation of the bath was noted. The bath parameters were measured and adjusted.

| Redox Value | 372 mV |
|---|---|
| Lineguard 101 meter reading | 150 microamperes |
| Bath temperature | 20-25° C. |

The redox value of the autodepositing coating bath during use was maintained by addition of hydrogen peroxide. Free fluoride ion level was monitored by a Lineguard®101 meter (available from Henkel Surface Technologies) and maintained in the range of 100 to 350 mA by addition of aqueous hydrofluoric acid. Once the bath had been prepared, steel substrates and multi-metal substrates of steel with a zinciferous coating were coated in the same autodeposition bath following the procedure below.

Processing Panels Through the Autodepositing Coating Bath of Example 1
  A. Cleaning
  B. Water rinsing
  C. Deionized water rinsing
  D. Treating with the modified autodeposition processing bath of Example 1
  E. Water rinsing
  F. Treating with Aquence® Reaction Rinse
  G. Baking A series of 4"×5" ACT cold rolled steel panels, hot-dip galvanized steel panels, electrogalvanized steel panels and galvanneal panels were immersed for 120 seconds in Ridoline 212, an alkaline cleaner available from Henkel Surface Technologies at 60° C., followed by a 60-second tap rinse and 60-second deionized water rinse. Each panel was immersed in the autodepositing coating bath for 90-seconds under ambient conditions followed by a 30-second dwell (i.e. the panel is raised out of the bath and allowed to drip for 30 seconds in air). The panel was then immersed in tap water for 60 seconds, to wash away undeposited coating bath, and was then immersed for 60-seconds in Aquence® Reaction Rinse E2, available from the Surface Technologies Division of Henkel Corporation, at 54° C. The panels were flashed in an oven for 5-minutes at 53° C. and then cured at 177° C. for 40 minutes. The autodeposition coating over the steel and the zinciferous (hot-dip galvanized steel panels, electrogalvanized steel panels and galvanneal panels) surfaces was examined under 100× magnification with an optical microscope and observed to be defect free (no pinholes or voids) and the edges were adequately covered with a black autodeposited coating.

Example 2

Pre-Polymerization Addition of Nitroethane

A modified autodeposition mini-emulsion dispersion was made using nitroethane as a pre-polymerization additive in a process utilizing mini-emulsion polymerization procedures, as follows:

To a clean, 2-liter, 4-necked flask, equipped with agitator, nitrogen inlet, condenser and addition funnel was added a) 167.8 grams of epoxy resin and b) 20.5 grams of blocked isocyanate to the flask. A homogeneous mixture of c) 174.5 grams of ethylenically unsaturated monomers, d) 7.3 grams of ester alcohol (2,2,4-trimethyl-1,3-pentanediol monoisobutyrate propionic acid), and e) 9.0 gm of nitroethane were added to the flask and mixed until the epoxy resin and the blocked isocyanate were dissolved. A homogeneous mixture of f) 16.2 grams of anionic surfactant @28% NV and g) 600 grams of deionized water were added to the flask over a period of 10 minutes with mixing. The crude dispersion was removed from the flask and passed through an M-110F Microfluidizer® to form a fine particle dispersion mini-emulsion having a particle distribution of between about 100 nm and about 500 nm, where average particle size was measured to be ~250 nm. The fine particle dispersion or mini-emulsion was loaded into a two (2) liter flask under nitrogen atmosphere equipped with an agitator, condenser and a nitrogen inlet, along with addition funnels. Then, h) 0.25 grams of 1% ferrous sulfate, i) 0.11 grams of sodium formaldehyde sulfoxylate (SFS) and j) 5.0 grams of deionized water mixture were added respectively into the flask with mixing and then the contents of the flask was heated to 55° C. A mixture of k) 1.1 grams of sodium formaldehyde sulfoxylate and 1) 25 grams of deionized water was then added to the flask at a uniform rate over a period of three hours. Midway through the addition period, a mixture of m) 1.6 grams of t-butyl hydroperoxide (t-B), and n) 25 grams of deionized water was added at a uniform rate over a period of 3 hours. During these additions, the contents of the flask were then heated to 65° C. Once the addition was complete, the flask contents were maintained at 65° C. for a period of one hour. The final measured solids were 35.96% by weight. The addition of nitroethane did not negatively effect production of the mini-emulsion polymer. No coagulation or precipitation was noted.

Example 3a

Autodeposition Composition Concentrate Prepared Using Dispersion of Example 2

An autodeposition composition concentrate containing the epoxy/acrylic anionically stabilized emulsion modified with nitroethane of Example 2 was prepared by adding carbon black pigment slurry as follows: In a one and half (1.5) liter container, 166.0 grams of 35.96% solids of the dispersion of Example 2 were combined with 6.0 grams of carbon black pigment slurry (40.5% solids), and the materials were allowed to mix for 10-60 minutes. No coagulation or precipitation was noted.

Example 3b

Autodeposition Composition Coating Bath Prepared Using the Dispersion of Example 2

To the concentrate composition in Example 3a, 37.5 grams of Aquence® Starter 300 and 1290.5 grams of deionized water were added, and the bath was allowed to mix for one (1) hour and was maintained under agitation at all times. No coagulation, separation or precipitation of the bath was noted. The bath parameters were measured and adjusted.

| | |
|---|---|
| Redox Value | 440 mV |
| Lineguard 101 meter reading | 220 microamperes |
| Bath temperature | 20-25° C. |

The redox value of the autodepositing coating bath during use was maintained by small additions of hydrogen peroxide. Free fluoride ion level was monitored by a Lineguard® 101 meter (available from Henkel Surface Technologies) and maintained in the range of 100 to 350 mA by addition of aqueous hydrofluoric acid.

A series of 4"×5" ACT cold rolled steel panels, hot-dip galvanized steel panels, electrogalvanized steel panels and galvanneal panels were coated with the prepared bath using the coating procedure of Example 1. The autodeposition coating over the steel and the zinciferous (hot-dip galvanized steel panels, electrogalvanized steel panels and galvanneal panels) surfaces was smooth and black. It was examined under 100× magnification with an optical microscope and observed to be defect free (no pinholes or voids) and the edges were satisfactorily coated.

Example 4

Post-Polymerization Addition of Tris(Hydroxymethyl) Nitromethane

A modified autodeposition coating bath was prepared as follows: hi a one and one half (1.5) liter container, 194.78 grams of 33.00% solids of Aquence® 930 Make-up was mixed with 37.5 grams of Aquence® Starter 300, 1267.7 grams of deionized water and 7.5 grams of 50% of tris (hydroxymethyl)nitromethane according to the procedure of Example 1. No coagulation, separation or precipitation of the bath was noted. The bath parameters were measured and adjusted.

| | |
|---|---|
| Redox Value | 396 mV |
| Lineguard 101 meter reading | 120 microamperes |
| Total % Non-Volatile | 1-10% |
| Bath temperature | 20-25° C. |

The bath was used to coat a series of 4"×5" ACT cold rolled steel panels, hot-dip galvanized steel panels, electrogalvanized steel panels and galvanneal panels. The coating and examination of the coated panels was performed according to the procedure of Example 1. The autodeposition coating over the steel and the zinciferous (hot-dip galvanized steel panels, electrogalvanized steel panels and galvanneal panels) surfaces were observed to be defect free (no pinholes or voids) and the edges were satisfactorily coated.

Example 5

Post-Polymerization Addition of N-Methylmorpholine N-Oxide

A modified autodeposition coating bath was prepared as follows: In a one and one half (1.5) liter container, 195.87 grams of 33.00% solids of Aquence® 930 Make-up was mixed with 30.0 grams of Aquence® Starter 300, 1274.1 grams of deionized water and 4.5 grams of 50% of N-methylmorpholine N-oxide. No coagulation, separation or precipitation of the bath was noted. The bath parameters were measured and adjusted.

| | |
|---|---|
| Redox Value | 386 mV |
| Lineguard 101 meter reading | 150 microamperes |
| Total % Non-Volatile | 1-10% |
| Bath temperature | 20-25° C. |

The bath was used to coat a series of 4"×5" ACT cold rolled steel panels, hot-dip galvanized steel panels, electrogalvanized steel panels and galvanneal panels. The coating and examination of the coated panels was performed according to the procedure of Example 1. The autodeposition coating over the steel and the zinciferous (hot-dip galvanized steel panels, electrogalvanized steel panels and galvanneal panels) surfaces were observed to be defect free (no pinholes or voids) and the edges were satisfactorily coated.

Example 6

Addition of 2-Bromo-2-Nitro-1,3-Propanediol to an Autodeposition Working Bath

A gray autodeposition coating bath modified with a nitrogen containing compound was prepared as follows:

A 146 liter capacity tank was filled with deionized water to approximately half capacity. 14.63 kg of Aquence 935G Component A (an autodeposition coating component described as a water-based dispersion of epoxy/acrylic copolymer, epsiloncaprolactam blocked cross-linker and carbon black pigment available from the Surface Technologies Division of Henkel Corporation) was added to the tank and allowed to mix for 30-60 minutes. Additional deionized water was used to fill the tank to approximately two thirds capacity and 668 grams of Aquence 935G Component 13 (an autodeposition coating component described as a water-based dispersion of $TiO_2$ pigment available from the Surface Technologies Division of Henkel Corporation) was added to the tank. The entire mixture was allowed to mix for 2-6 hours, no coagulation or precipitation was noted. Thereafter, 4.66 kg of Aquence® Starter 300, 40 grams of HF and additional deionized water were added to fill the tank nearly to capacity. Again, the mixture was allowed to mix for 12-24 hours. After this period, 912 grams of 2-bromo-2-nitro-1,3-propanediol (40%) was added to the tank.

The bath parameters were measured and adjusted.

| | |
|---|---|
| Redox Value | 395 mV |
| Lineguard 101 meter reading | 140 microamperes |
| Total % Non-Volatile | 3.76% |
| Wet coating solid | 41.1% |
| Starter titration before adjustment | 14.1 ml |
| Bath temperature | 20-25° C. |
| Conductivity | 2000 microSiemens |

The redox value of the autodepositing coating bath during use was maintained by small additions of hydrogen peroxide. Free fluoride ion level was monitored by a Lineguard® 101 meter (available from Henkel Surface Technologies) and maintained in the range of 100 to 350 mA by addition of aqueous hydrofluoric acid.

Once the bath had been prepared, a first set of 4"×12" ACT cold rolled steel panels, hot-dip galvanized steel panels, electrogalvanized steel panels and galvanneal panels were coated according to the procedure of Example 1, except that all panels were treated simultaneously and the reaction rinse was modified by addition of 0.7 g/l fluorosilicic acid. The autodeposition coating over the steel and the zinciferous (hot-dip galvanized steel panels, electrogalvanized steel panels and galvanneal panels) surfaces produced was light gray in color and appeared to uniformly coat all edges in a defect free manner. The panels were examined under 100× magnification with an optical microscope and observed to be defect free (no pinholes or voids) and the edges were satisfactorily coated.

A second set of panels, coated separately with the autodeposition bath of Example 6, were subjected to cross hatch adhesion testing per ASTM D3359 Method B (rating is 1 to 5, higher being better) and corrosion testing per GM 14872 method, as is known in the art. Performance of the coating is given in the Table 1.

TABLE 1

|  | Cold Roll Steel | Hot Dip Galvanized | Electro-galvanized | Galvan-neal |
|---|---|---|---|---|
| Cross Hatch Adhesion ASTM D3359 method B | 5B | 5B | 5B | 5B |
| GM 14872 28 Cycles average scribe creep (in mm) | 4.34 | 2.41 | 3.6 | 2.14 |

Table 1 shows that the autodeposition coating deposited from the 2-bromo-2-nitro-1,3-propanediol containing autodeposition bath achieve the highest rating for adhesion in the cross hatch test. The corrosion performance of the autodeposition coating deposited from the Example 6 bath is comparable to conventional autodeposition primers on steel and better than the conventional autodeposition primers on zinciferous surfaces.

Example 7

Multi-Metal Substrate Assembly Coated with Autodeposition Coating

A gray autodeposition coating bath containing 2-bromo-2-nitro-1,3-propanediol according to Example 6, but was made in a greater quantity of a 4239 liter working bath and with slight modification in the amount of Aquence® Starter 300 and 2-bromo-2-nitro-1,3-propanediol. 30 gallon of Aquence® Starter 300 and 5.3 kg of 2-bromo-2-nitro-1,3-propanediol were used to make the bath. The bath parameters were measured and adjusted.

| Redox Value | 400 mV |
|---|---|
| Lineguard 101 meter reading | 110 microamperes |
| Total % Non-Volatile | 3.76% |
| Wet coating solid | 33% |
| Starter titration before adjustment | 14.5 ml |
| Bath temperature | 20-25° C. |
| Conductivity | 1800 microSiemens |

The redox value of the autodepositing coating bath during use was maintained by small additions of hydrogen peroxide. Free fluoride ion level was monitored by a Lineguard® 101 meter (available from Henkel Surface Technologies) and maintained in the range of 100 to 350 mA by addition of aqueous hydrofluoric acid.

The bath was allowed to equilibrate for 12-24 hours with constant circulation. Thereafter a series of formed multi metal automobile doors obtained from various automakers were coated according to the procedure of Example 1. The combinations of metal substrates present in the automobile doors varied. Some doors were electrogalvanized steel; and other doors were hot-dip galvanized steel. Each of the doors also contained uncoated steel supports affixed to the doors. The autodeposition coating over the steel supports and the zinciferous (hot-dip galvanized steel and electrogalvanized steel) surfaces produced was light gray in color and uniformly coated all metal substrates and the metal's edges in a defect free manner. Some of the thus coated doors were cut into sections and these sections examined under 100× magnification with an optical microscope and observed to be defect free (no pinholes or voids) and the edges were satisfactorily coated.

Example 8

Cast Iron Coated with 2-Bromo-2-Nitro-1,3-Propanediol Autodeposition Coating

A modified autodeposition coating bath was prepared as follows: In a one and one half (1.5) liter container, 233.18 grams of Aquence® 930 Make-up was mixed with 37.5 grams of Aquence® Starter 300, 1226.32 grams of deionized water and 3.0 grams of 2-bromo-2-nitro-1,3-propanediol according to the procedure of Example 1. No coagulation, separation or precipitation of the bath was noted. The bath parameters were measured and adjusted.

| Redox Value | 398 mV |
|---|---|
| Lineguard 101 meter reading | 160 microamperes |
| Bath temperature | 20-25° C. |

The redox value of the autodepositing coating bath during use was maintained by small additions of hydrogen peroxide. Free fluoride ion level was monitored by a Lineguard® 101 meter (available from Henkel Surface Technologies) and maintained in the range of 100 to 350 mA by addition of aqueous hydrofluoric acid.

The bath was allowed to equilibrate for 1-2 hours with constant circulation. Thereafter a series of commercially available 4"×6" cast iron ACT panels were coated according to the procedure of Example 1. The cast iron had roughened surfaces resulting from manufacture that rendered the substrate a more "active" metal as compared to commercially available cold rolled steel sheets. The autodeposition coating produced over the cast iron uniformly coated the metal substrates and the metal's edges in a defect free manner.

What is claimed is:

1. An autodepositing bath composition comprising:
    water,
    a polymerized epoxy-acrylic mini-emulsion autodepositable dispersion,
    an aliphatic nitroalcohol comprising a diol,
    an activating system,
    at least one latent crosslinking agent, and
    optionally an oxidizing agent.

2. The autodepositing bath composition of claim 1 wherein the composition contains an anionic emulsifying agent present in an amount of about 0.1 wt. % to about 5 wt. % based on weight of total composition solids.

3. An article of manufacture comprising:
    a. one or more metal surfaces comprising at least one metal selected from ferrous, zinc, aluminum, magnesium and alloys thereof;
    b. an autodeposition coating deposited on said one or more metal surfaces,
    wherein said autodeposition coating is obtained from the autodeposition bath composition of claim 1.

4. The autodepositing bath composition according to claim 1 wherein the aliphatic nitroalcohol comprising a diol is incorporated into organic dispersion particles of the polymerized epoxy-acrylic mini-emulsion autodepositable dispersion during polymerization.

5. The autodepositing bath composition according to claim 1, further comprising one or more pigments selected from carbon black, titanium dioxide, green pigment, yellow pigment, red pigment and blue pigment.

6. A method of generating a uniform autodeposition coating on a multi-metal substrate comprising steps of:
 a. cleaning a multi-metal substrate comprising surfaces of two or more of ferrous metal, zinc-coated or galvanized ferrous metal, aluminum, magnesium, zinc, aluminum alloys and zinc alloys;
 b. contacting the multi-metal substrate with the autodeposition bath of claim 1, said contacting taking place for a sufficient amount of time to produce a coated multi-metal substrate having a final film coating thickness of from about 1 to about 50 microns;
 c. maintaining the aliphatic nitroalcohol comprising a diol at an average concentration of from about 0.1 grams per liter to 20 grams per liter within the autodeposition bath;
 d. rinsing the coated multi-metal substrate.

7. The method according to claim 6, further comprising an additional step of heating the coated multi-metal substrate at a temperature of greater than 100° C. for a time sufficient to cure the film.

8. The method according to claim 6, wherein the heating step comprises a sub-step wherein a powder paint is applied to the coated multi-metal substrate, with or without a reduction in temperature during the sub-step, followed by further heating for a time sufficient to co-cure the film and the powder paint.

9. An autodepositing bath composition for coating a multi-metal substrate with edge coverage comprising:
 a) water,
 b) a polymerized epoxy-acrylic mini-emulsion autodepositable dispersion,
 c) an aliphatic nitroalcohol selected from the group consisting of diols, triols, or mixtures thereof present in the autodepositing bath composition in an amount ranging from about 0.01 g/liter to about 20 g/liter,
 d) an activating system comprising fluoride,
 e) a latent crosslinking agent, and
 f) an oxidizing agent comprising hydrogen peroxide present in an amount ranging from about 15 to about 50 ppm,
 wherein the autodepositing bath composition is effective to autodeposition coat a multi-metal substrate comprising a cold rolled steel surface and at least one surface of hot dipped galvanized, electro-galvanized or galvanneal substrates, including edges of the substrates and has an operating window of 101 Lineguard readings of 60 to 350 micro amps.

10. The autodepositing bath composition for coating a multi-metal substrate with edge coverage of claim 9 wherein, the aliphatic nitroalcohol is selected from the group consisting of 2-bromo-2-nitro-1,3-propanediol, tris(hydroxymethyl) nitromethane, and mixtures thereof.

11. The autodepositing bath composition according to claim 1 wherein the latent crosslinking agent comprises (a) molecules that contain at least two reactive functional groups selected from thiol, carboxyl, carboxylic acid anhydride and combinations thereof; and/or (b) molecules that contain at least two blocked isocyanate groups.

12. The autodepositing bath composition for coating a multi-metal substrate with edge coverage according to claim 9 wherein the latent crosslinking agent comprises (a) molecules that contain at least two reactive functional groups selected from thiol, carboxyl, carboxylic acid anhydride and combinations thereof; and/or (b) molecules that contain at least two blocked isocyanate groups.

\* \* \* \* \*